United States Patent [19]

Brown

[11] Patent Number: 4,758,054
[45] Date of Patent: Jul. 19, 1988

[54] BRAKING SYSTEM ANTI-LOCK MODULATOR CONFIGURATION

[75] Inventor: G. Emerson Brown, Niles, Mich.

[73] Assignee: Allied Corporation, Morristown, N.J.

[21] Appl. No.: 789,203

[22] Filed: Oct. 18, 1985

[51] Int. Cl.[4] .............................................. B60T 8/32
[52] U.S. Cl. ...................... 303/114; 188/181 A;
    303/110; 303/111; 303/116; 303/119; 303/61;
    303/68
[58] Field of Search ............... 303/119, 116, 115, 114,
    303/113, 117, 61–63, 68–69, 110, 13, 14, 111,
    10–12, 6 R, 6 A, 91, 92, 93; 188/181; 60/547.1

[56] References Cited

U.S. PATENT DOCUMENTS

| | | | |
|---|---|---|---|
| 3,550,966 | 12/1970 | Leiber | 303/119 |
| 3,753,598 | 8/1973 | Michellone et al. | 303/119 |
| 4,099,793 | 7/1978 | Iio | 303/119 X |
| 4,129,341 | 12/1978 | Pauwels | 303/115 X |
| 4,179,166 | 12/1979 | Sharp et al. | 303/119 |
| 4,182,536 | 1/1980 | Pauwels | 303/115 |
| 4,206,950 | 6/1980 | Elliott | 303/110 |
| 4,416,347 | 11/1983 | Bertling et al. | 303/110 X |
| 4,418,966 | 12/1983 | Hattwig | 303/119 X |
| 4,462,642 | 7/1984 | Leiber | 303/119 |
| 4,492,413 | 1/1985 | Belart et al. | 303/119 X |
| 4,509,802 | 4/1985 | Solleder et al. | 303/110 |
| 4,565,411 | 1/1986 | Seiber | 303/110 |
| 4,603,920 | 8/1986 | Otsuki et al. | 303/119 X |

FOREIGN PATENT DOCUMENTS 2049262  4/1972  Fed. Rep. of Germany ...... 303/119

Primary Examiner—Douglas C. Butler
Attorney, Agent, or Firm—Ken C. Decker

[57] ABSTRACT

A control valve assembly for use in an anti-lock braking system wherein a 3-way isolation valve normally connects a wheel cylinder to a master cylinder and isolates that wheel cylinder(s) from the master cylinder and simultaneously connects the wheel cylinder to the common connection of a pressure modulating unit when the anti-lock system has been energized. The assembly enables use of a three channel anti-lock system in a dual circuit cross split brake system and increases the protection of the normal brake circuit from leakage in the modulating unit.

2 Claims, 2 Drawing Sheets

BRAKING SYSTEM ANTI-LOCK MODULATOR CONFIGURATION

The present invention relates to anti-lock braking systems and more particularly to a solenoid actuated modulating valve configuration which improves certain failure modes of such a system and enables use of the system with cross-split braking systems with little or no increase in hardware.

Anti-lock braking systems continue to develop and gain acceptance. In contemporary systems, it has become accepted to use up to three solenoid actuated valves for each control channel of the system. One of these valves effects isolation of the wheel cylinders of a channel from the normal brake pressure modulator such as, for example, a master cylinder or a manually modulated hydraulic booster, a second solenoid valve for reducing or "decaying" brake pressure in the system in response to control signals generated in response to rotational behavior of the vehicles wheels, and a third solenoid valve, also responsive to the control signals for increasing brake pressure, pressurized brake fluid for this purpose being obtained from another fluid source such as a motor-driven pump or booster. It is further a common practice in such systems to connect the isolation valve in series between the source of pressurized brake fluid and the wheel cylinder. With such a configuration, a leak in a decay valve can cause a decrease or loss of normal braking. It is also possible to trap bubbles in the system between the isolation valve and the wheel cylinder. This configuration is further not well suited for use in a cross-split braking system which is further provided with a three-channel anti-lock system, that is, a system in which two front wheels of a vehicle are controlled separately and the rear wheels are controlled as a pair. Such a cross-split system requires individual modulators for each rear brake. There therefore exists a need for an improved control or modulating valve configuration for use in anti-lock braking systems which eliminates the afore-mentioned problems.

In its broader aspects, the present invention is a modulating valve configuration for use in an anti-lock braking system wherein isolation of the anti-lock channel is effected by means of a three-way valve which connects the build and decay valves of a channel in parallel with the standard braking system of the vehicle.

More specifically, the invention is a modulating valve configuration for use in an anti-lock braking system which includes a source of pressure fluid such as a master cylinder or hydraulic booster and at least one wheel cylinder. The control valve assembly includes an isolation valve for interrupting fluid communication between the master cylinder and wheel cylinder and connecting the wheel cylinder to a common connection of an anti-lock brake pressure modulating device. In this configuration, bubbles in the system occurring between the build valve and a wheel cylinder isolation valve are not trapped in the normal braking system. In this configuration, it is also possible to adapt a cross-split braking system to a three channel anti-lock braking system with the addition of a second rear isolation valve. Each rear isolation valve connects its respective rear wheel cylinder normally to its respective master cylinder chamber, and to the common anti-lock pressure modulating device when in its second operating position.

It is therefore an object of the invention to provide an improved modulating valve configuration for use in anti-lock braking systems.

It is another object of the invention to provide such a valve configuration which obviates trapping of bubbles in the system occurring between the pressure build valve and a wheel cylinder that will affect normal braking.

It is another object of the invention to provide a valve configuration for an anti-lock braking system that protects the system against leakage from the anti-lock pressure decay modulating valve to the low pressure return.

Still another object of the invention is to provide a valve configuration which enables the use of a three channel anti-lock braking system in a cross-split brake system.

These and other objects and purposes of the invention are described in and will be best understood in view of the following detailed description taken in conjunction with the attached drawings wherein:

FIG. 3 is a simplified schematic diagram showing a typical prior art modulating valve configuration used in anti-lock brake systems.

DESCRIPTION OF THE PREFERRED EMBODIMENTS

Figure 1:
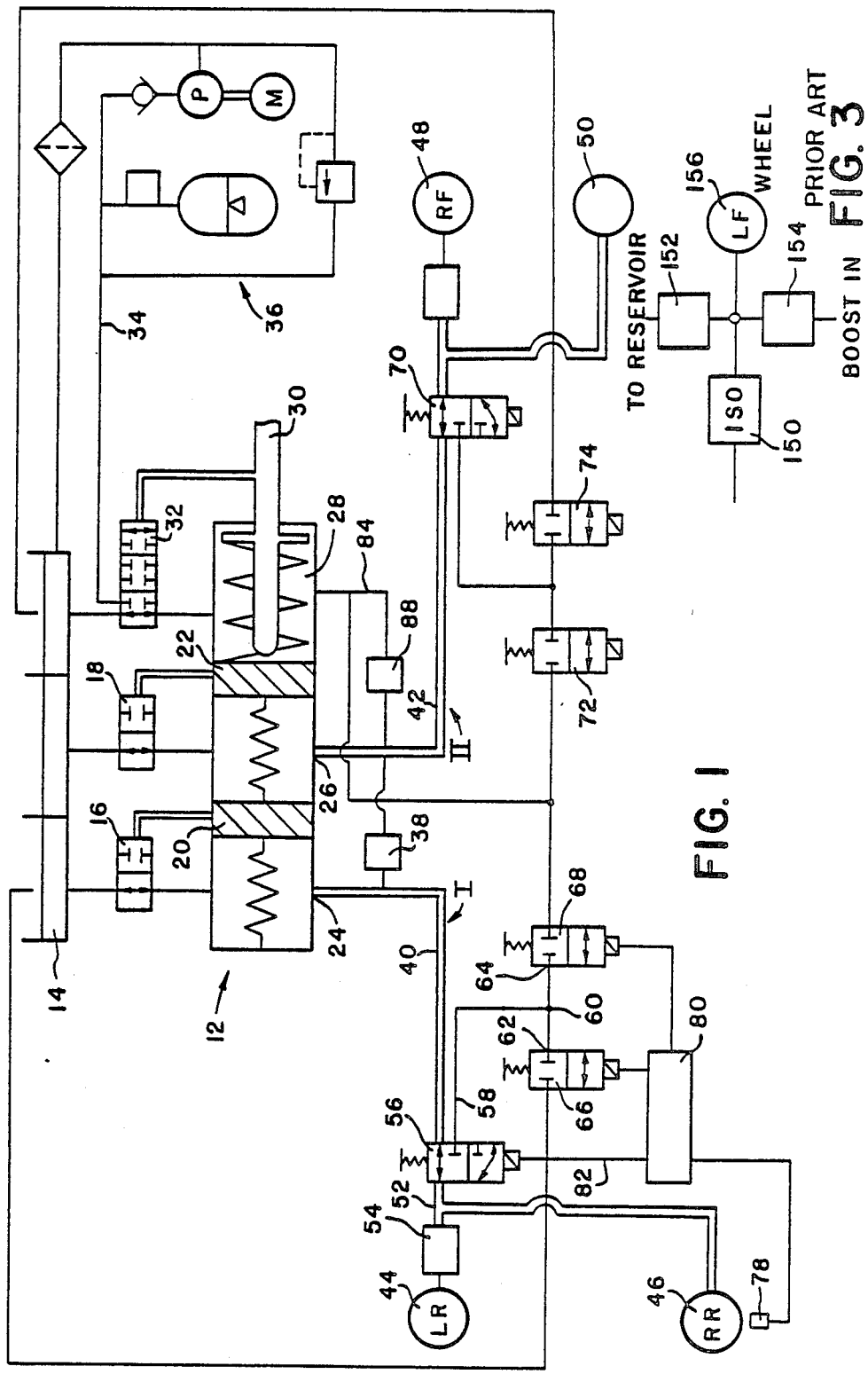
FIG. 1 is a schematic diagram of a braking system incorporating a two-channel anti-lock braking system.

Referring first to FIG. 1, there is shown in schematic a two channel braking system which includes a dual circuit master cylinder 12 which receives braking fluid from a reservoir 14 through a pair of shut off valves 16, 18. The two master cylinder pistons 20, 22 produce pressurized brake fluid at master cylinder output ports 24, 26 in response to pressurized braking fluid in boost chamber 28. The fluid in chamber 28 in turn is manually modulated by means of an actuating rod 30 which mechanically modulates a hydraulic control valve 32. Valve 32 is, in turn, connected to receive pressurized braking fluid by a conduit 34 connected to a motor driven pump and accumulator assembly 36. In now conventional manner, failure of one or the other of the two braking channels I, II, is detected by a pressure differential switch 38 connected between output conduits 40, 42 and mechanical actuation of the pistons 20, 22 is effected via control rod 30.

Four wheel brake cylinders 44, 46, 48, and 50 are provided. In the illustrated embodiment, it will be seen that these are connected in a cross-split configuration with one front and an oppositely disposed rear-wheel cylinder comprising each of channels I and II. Cylinders 44, 46 are commonly connected at 52, a proportioning valve 54 being interposed between connection 52 and left rear cylinder 44 to balance or proportion pressure between the front and rear cylinders. The connection 52 is coupled through a 3 way isolation valve 56 to the conduit 40 through its normally open circuit. The normally closed circuit of isolation valve 56 extends between the conduit 52 and an output conduit 58. Conduit 58, in turn, is connected to a common connection 60 connected to the inputs 62, 64 of a pair of normally closed 2 way valves 66, 68.

Valve 66 connects intersection 60 to the reservoir 14 and valve 68 connects connection 60 to chamber 28 to provide for decay and build of pressure and are accordingly designated the "decay" and "build" valves, respectively.

A 3 way isolation valve 70, build valve 72 and decay valve 74 are identically connected in control channel II in cooperation with wheel cylinders 48 and 50 associated with the right rear and left front wheels of the vehicle, respectively.

In operation, during normal braking, valve 56 is in its normal state whereby wheel cylinders 44, 46 are operated in conventional fashion from the piston 20. In the event that the anti-lock control system senses an incipient lock condition by means of a wheel sensor 78 and electronic control 80, it will output control signals via output lines as at 82 to operate the solenoid actuators of the valves 56, 66, and 68. Initially, isolation valve 56 is actuated thereby interrupting fluid communication between master cylinder 12 (piston 20) and wheel cylinders 44, 46. Simultaneously, 3 way isolation valve 56 connects the wheel cylinders 44, 46 to output conduits 58 and 60 and through the valve 68 to conduit 84 connected to the chamber 28. This connects the valves 56, 66, and 68 to the fluid pressure source 36 or to the reservoir 14. Decay and building of brake pressure can now be performed in accordance with well known anti-lock brake systems. Control channel II is identical and operates in the same manner. Typically, a pressure differential switch 88 will also be provided in the system to sense a failure of boost pressure to deactivate the anti-lock system and convert the system to manual operation. It will be apparent that the system in FIG. 1 can be applied to any two channel anti-lock system whether of the cross-split type as shown, or conventional front rear split.

Figure 2:
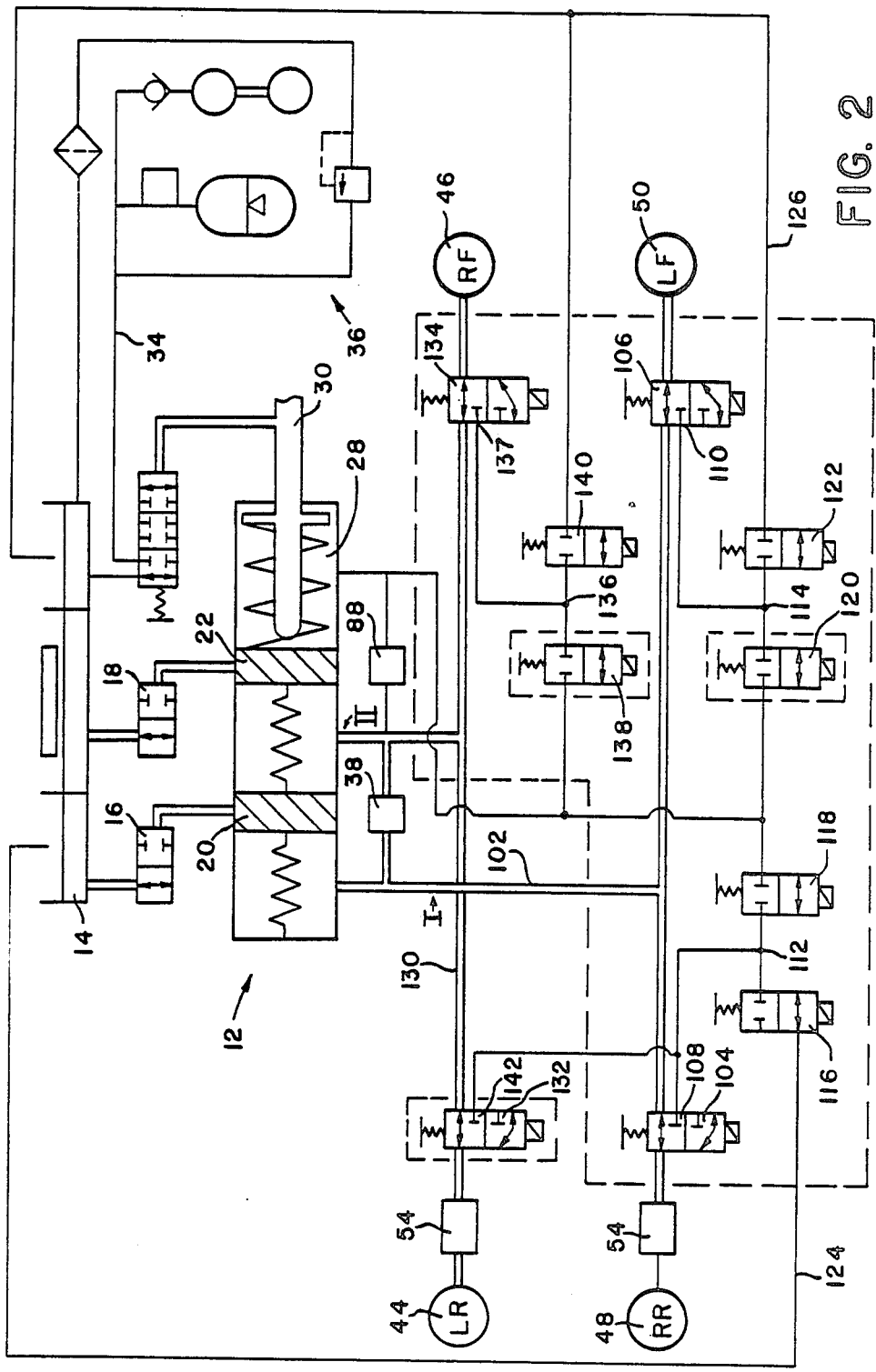
FIG. 2 is a schematic diagram of a cross-split braking system incorporating a three-channel anti-lock brake system.

Referring now to FIG. 2, there is shown a three channel anti-lock braking system applied to a cross-split brake system.

In this embodiment, master cylinder 12, reservoir 14, shut off valves 16, 18 and the pump 36 are identical in configuration and function to that disclosed in FIG. 1 and the like numerals apply to like elements. Channel I is coupled to piston 20 via conduit 102. Conduit 102 splits and is connected to right rear wheel cylinder 48 and left front wheel cylinder 50 through a pair of 3 way valves 104, 106, respectively, this connection being through the normally open ports of the valves. The normally closed ports 108, 110 are connected to the common connections 112, 114 of normally closed pairs of build and decay valves 116, 118 and 120, 122. The outputs of the decay valves 116, 122 are connected via return conduits 124, 126 to the reservoir 14.

Similarly, left rear cylinder 44 and right front cylinder 46 are connected to piston 22 via conduit 130 through the normally open ports of 3 way isolation valves 132, 134, respectively. The normally closed port 137 of valve 134 is connected to the common connection 136 of another pair of build and decay valves 138, 140 the other ports of which are connected to the boost chamber 28 and reservoir 14, respectively. The normally closed port 142 of 3 way isolation valve 132 is connected to the common connection 112 of the build decay valve pair 116, 118. Thus configured it will be seen that in a normal operating mode the braking system is connected as a conventional cross-split braking system having two channels I and II. When the anti-lock system is energized, and on command each of the four 3 way valves 104, 106, 134 and 132 will isolate their respective wheel cylinders 48, 50, 46 and 44 from the master cylinder 12 and simultaneously connect the right front and left front wheel cylinders 46, 50 to respective pairs of build and decay valves 120, 122 and 138, 140 and further connect left rear and right rear cylinders 44, 48 as a pair to the build decay valve pair 116, 118. It will thus be seen that in this state the system operates as a conventional three channel anti-lock system with individual control of the front wheels and joint control of the two rear wheels. This is further accomplished with the addition of only a single additional isolation valve 132 compared to a similar 3-channel vertical split system. That is, a conventional cross-split dual channel braking system can be converted to a three channel anti-lock braking system with the addition of only one additional isolation valve 132.

Referring briefly to FIG. 3, there is shown for contrast, a typical prior art valve configuration wherein the isolation valve 150 is provided as a standard normally open 2 way valve and the build and decay valves 152, 154 are connected fluidly downstream from the isolation valve 150 to a wheel cylinder 156. This is distinguishable with the configuration of the present invention wherein the build and decay valves are in effect connected in parallel with the master cylinder circuit and are alternately switched into the circuit by means of 3 way isolation valves.

This novel configuration of valves enables adaptation of a three channel anti-lock braking system to a cross-split braking system. Leaks through the decay valve will not affect normal braking because of the isolation of the decay circuit by the isolation valve during normal brake operation. Additionally, with the configuration of the present invention the flow path of the decay and build valves may be made smaller without affecting normal braking flow thereby allowing use of smaller solenoids in the anti-lock system.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

I claim:

1. For use in an anti-lock braking system which includes a master cylinder, a booster operatively coupled to the master cylinder and having a pressure fluid output and a return and at least one wheel cylinder, a control valve assembly which includes isolation valve means including a three-way isolation valve having a normally open port connected to provide fluid communication between said master cylinder and each wheel cylinder and a normally closed port, modulating valve means for automatically modulating fluid pressure to said wheel cylinder, characterized in that said modulating valve means includes a normally closed pressure build valve and a normally closed pressure decay valve each having one port thereof connected in common to said normally closed port of said three-way isolation valve, the other port of said pressure build and pressure decay valves being connected to said booster pressure fluid output and return, respectively, said anti-lock braking system being a three channel anti-lock braking system including four wheel cylinders normally connected in a dual channel cross-split configuration, there being one said isolation valve for each said wheel cylinder and a modulating valve means for each channel of said anti-lock braking system, one said three-way isolation valve having its normally open port connecting one of the rear wheel cylinders to said master cylinder, and its normally closed port connecting said wheel cylinder to the normally closed port of the three-way isolation valve connected to the other of said rear wheel cylinders whereby both said rear wheel cylinders are commonly connected to one said modulating valve means.

2. The control valve assembly of claim 1 wherein said build and decay valves are solenoid actuated 2-way valves.

* * * * *